United States Patent [19]

Axthammer et al.

[11] Patent Number: 4,508,201
[45] Date of Patent: Apr. 2, 1985

[54] PISTON ROD WITH AN INTEGRAL PISTON FOR A SHOCK ABSORBER

[75] Inventors: Ludwig Axthammer, Hambach; Felix Wössner, Schweinfurt, both of Fed. Rep. of Germany

[73] Assignee: Fichtel & Sachs AG, Schweinfurt, Fed. Rep. of Germany

[21] Appl. No.: 382,368

[22] Filed: May 26, 1982

[30] Foreign Application Priority Data

Jun. 13, 1981 [DE] Fed. Rep. of Germany ....... 3123575

[51] Int. Cl.³ ............................. F16F 9/34; F16F 9/36
[52] U.S. Cl. ............................. 188/322.19; 188/322.18
[58] Field of Search ....................... 188/322.19, 322.22, 188/322.16, 322.17, 322.18, 322.15, 322.14, 322.13, 322.11, 313–318, 311, 281, 282, 269, 276; 267/64.15, 120, 64.23, 124, 64.26, 139; 92/248, 212, 174, 169–171, 162, 163, 164

[56] References Cited

U.S. PATENT DOCUMENTS

| | | | |
|---|---|---|---|
| 2,637,414 | 5/1953 | Patriquin | 188/322.15 |
| 2,818,942 | 1/1958 | Bliven | 188/315 |
| 3,621,949 | 11/1971 | Watson | 188/322.17 X |
| 3,633,966 | 1/1972 | Epple et al. | 188/317 X |
| 3,724,615 | 4/1973 | Stormer | 188/317 X |
| 4,270,635 | 6/1981 | Wössner | 188/322.17 |
| 4,356,898 | 11/1982 | Guzder et al. | 188/322.15 X |
| 4,401,196 | 8/1983 | Grundei | 188/322.15 X |

FOREIGN PATENT DOCUMENTS

| | | | |
|---|---|---|---|
| 1455932 | 7/1970 | Fed. Rep. of Germany | 188/322.15 |
| 2404706 | 8/1975 | Fed. Rep. of Germany | |
| 608933 | 9/1960 | Italy | 188/322.15 |
| 556903 | 10/1943 | United Kingdom | |
| 1473427 | 5/1977 | United Kingdom | |

*Primary Examiner*—Douglas C. Butler
*Attorney, Agent, or Firm*—Toren, McGeady and Stanger

[57] ABSTRACT

In a cylinder piston device having an axis and two end walls, a cavity is defined between the two end walls. A piston rod is axially movable with respect to the cylinder member and passes through one of the end walls. The piston rod is at least partially defined by a piston rod tube. A piston unit is defined by a radially widened portion of the piston rod tube. The piston unit separates the cavity into two working chambers adjacent respective end walls, one of the working chambers being an annular working chamber radially extending between a radially outer surface of the piston rod and a radially inner surface of the cylinder member. Fluid passages extend between the working chambers across the piston unit. The fluid passages includes at least one opening extending through the piston rod tube.

12 Claims, 7 Drawing Figures

PISTON ROD WITH AN INTEGRAL PISTON FOR A SHOCK ABSORBER

SUMMARY OF THE INVENTION

The present invention is directed to a cylinder piston device and, more particularly, to hydropneumatic and pneumatic cylinder piston devices to be used, for example, as shock absorbers, spring struts of vehicles and gas springs. The cylinder piston device comprises a cylinder member having an axis and two end walls. A cavity is defined within the cylinder member between the two end walls. A piston rod is provided which is axially movable with respect to the cylinder member and passes through at least one of the two end walls. A piston unit is provided on the piston rod within the cavity. This piston unit separates the cavity into two working chambers adjacent respective end walls. At least one of the working chambers is an annular working chamber radially extending between a radially outer surface of the piston rod and a radially inner surface of the cylinder member. Fluid passage means extend between the two working chambers across the piston unit.

Such a type of cylinder piston device is, for example, known from U.S. Pat. No, 4,270,635. In this known cylinder piston device, the piston rod comprises a tubular section. The piston unit is established by a separate piston member fixed to the tube section of the piston rod.

From German Offenlegungsschrift No. 2,404,706, it is known to provide the piston unit in the form of a radially widened portion of a piston rod tube. In this known construction, the annular space defined between the radially outer surface of the piston rod and the radially inner surface of the cylinder member has a constant volume irrespective of the axial position of the piston rod with respect to the cylinder member due to a guiding and sealing unit provided between the piston rod and the cylinder member being axially fixed with respect to the piston rod. Thus, this annular space does not act as a working chamber and is not in fluid connection with a further working chamber on the other side of the piston unit.

The main object of this invention is to provide a cylinder piston device of the type known from U.S. Pat. No. 4,270,635 having a piston unit integral with the piston rod which can be easily manufactured in a most economic way.

In view of this object, the piston rod in a cylinder piston device of the type as known from U.S. Pat. No. 4,270,635 comprises a piston rod tube defining a hollow space therein. The piston unit comprises a radially widened portion of the piston rod tube. The fluid passage means comprise at least one opening extending through said piston rod tube.

The cylinder piston device of this invention has a small weight due to the design of the piston rod-piston unit and a high rigidity also with respect to dynamic forces. Moreover, the piston unit can be perfectly centered with respect to the piston rod.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
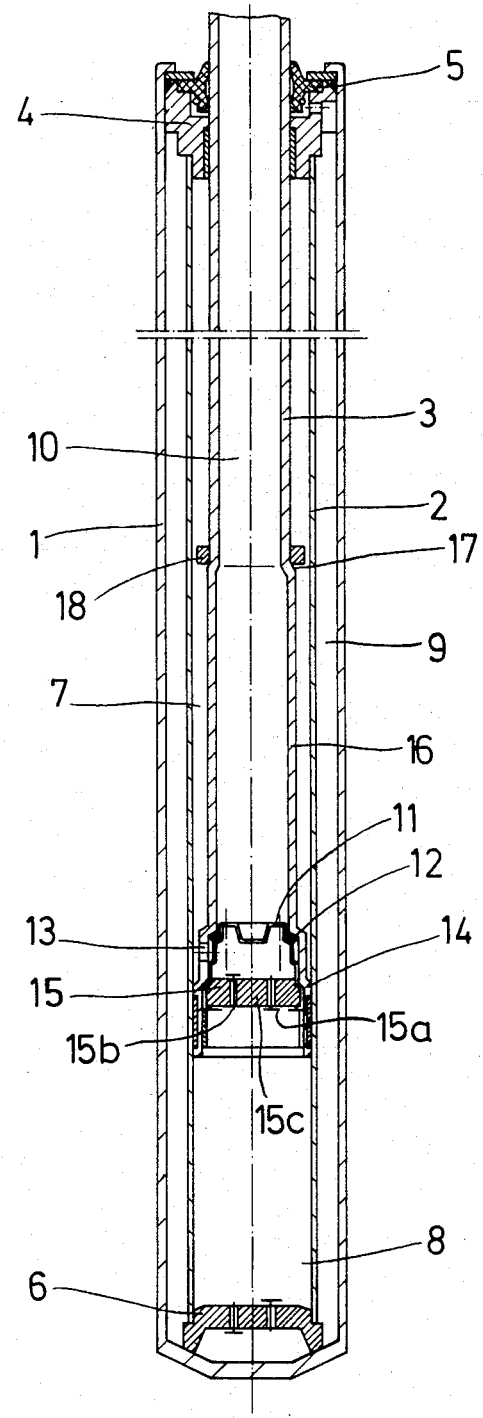
FIG. 1 shows a shock absorber unit according to this invention in longitudinal section.

FIG. 1 shows as an illustration of this invention a hydropneumatic double-tube vibration damper which is adapted to be inserted into a receiving tube of a spring strut of a motor vehicle. The working chambers 7 and 8 are filled with damping liquid, while the working chamber 9 is filled partially with damping liquid and partially with gas. This vibration damper or shock absorber comprises the container 1 in which a cylinder 2 is arranged. A compensation chamber 9 is defined by the annular space radially between the container 1 and the cylinder 2. The cylinder 2 is axially clamped in central position with respect to the container 1 by a bottom valve unit 6 and by a piston rod guide unit 4. A piston rod 3, of substantially tubular formation, is sealed off to the exterior by a piston rod seal unit 5. The interior 10 of the piston rod 3 is sealed off against the damping liquid in the working chambers 7 and 8 by a partition 11 and a sealing ring 12. At the lower or inner end, the piston rod 3 has a widened portion 14 forming a piston, in which a damping device 15 is received. The piston rod comprises a widened axially inner portion being so selected in its axial length that a shoulder 17 provided at the transition between this axially inner portion and an axially outer portion of smaller diameter defines an abutment face for an outward movement limiting ring 18.

On movement of the piston rod 3 out of the cylinder 2, damping liquid flows from the working chamber 7 through bores 13 and through a damping valve 15a of the damping device 15 into the working chamber 8. At the same time a quantity of damping liquid corresponding to the outwardly moving piston rod volume is sucked out of the compensation chamber 9 through the bottom valve unit 6 into the working chamber 8. The outward movement of the piston rod 3 is limited by the ring 18 striking on the end face of the piston rod guide unit 4. On inward movement of the piston rod 3 into the cylinder 2, damping liquid flows from the working chamber 8 through a damping valve 15b of the damping device 15 and through the bores 13 into the working chamber 7. At the same time, a quantity of liquid flows into the compensation chamber. This quantity corresponds to to increasing volume which is required by the inwardly moving piston rod. A strong flow resistance damps this flow of liquid.

Figure 2:
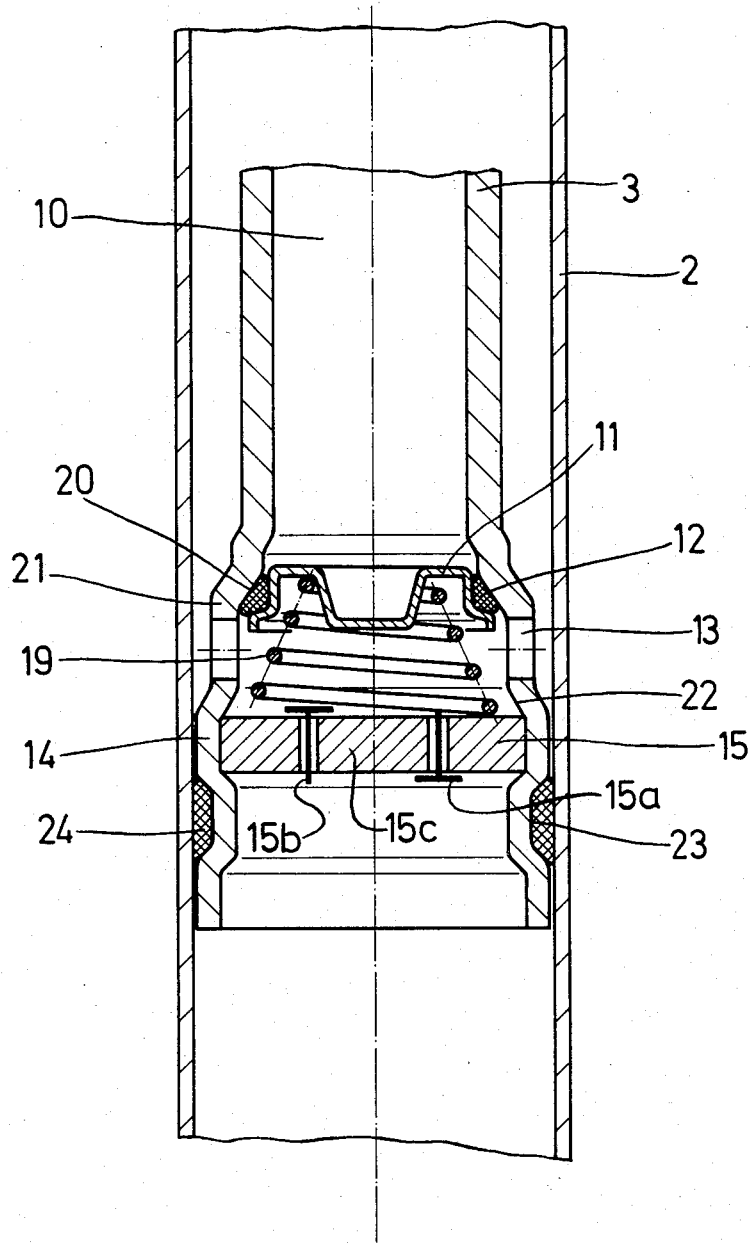
FIG. 2 shows a first embodiment of a piston rod-piston unit of this invention in longitudinal section.

Details of the piston rod 3 situated in the cylinder 2 are shown in FIG. 2, which clarifies the very simple assembly and the high dynamic strength of the piston rod-piston unit. The piston rod 3 possesses a first shoulder 21 which forms the abutment face 20 for a sealing ring 12. The inner chamber 10 of the piston rod 3 is sealingly closed by a partition 11 which is axially held against the sealing ring 12 by means of a spring 19. The damping device 15 is secured in a widened portion 14 of the piston rod having an outer diameter corresponding to the internal diameter of the cylinder 2. This widened portion 14 receives a valve plate 15c of the damping device 15. In assembly, this valve plate 15c is pressed against the force of the spring 19 into sealing contact with a preshaped abutment surface 22 and then a re-shaping of the piston rod is performed in such manner that the valve plate 15c is axially fixed and a receiving groove 23 is formed at the same time for a guide and sealing ring 24. The bores 13 are preferably punched.

Figure 3:
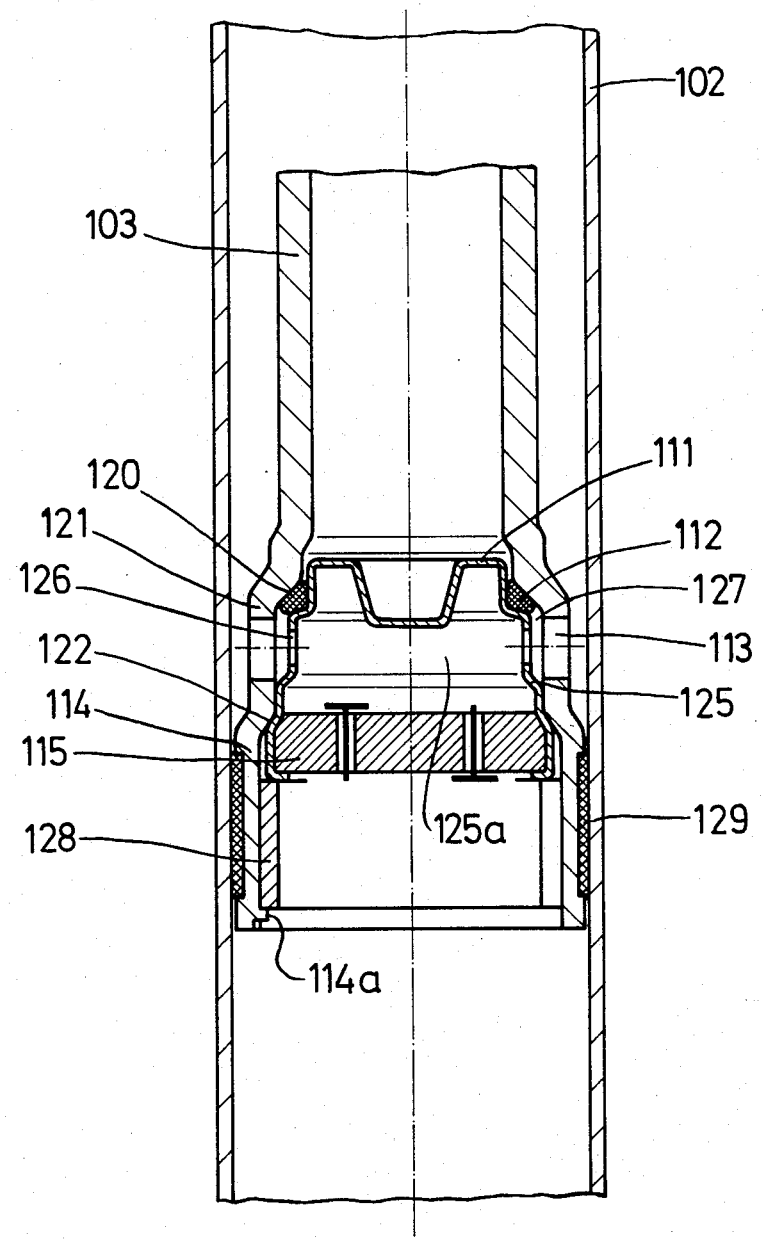
FIG. 3 shows a second embodiment of the piston rod-piston unit of this invention.

The form of embodiment according to FIG. 3 shows a cylinder-piston unit similar to that of FIG. 2, analogous components being designated by the same reference numbers increased by 100. The partition 111 is an integral part of a cup-shaped component 125 which is pre-assembled with the damping device 115. The pre-assembled construction has the advantage that before installation it can be subjected to an examination of function in a special test device. The installation of the pre-assembled unit 125, 115 in the piston rod 103 is effected by pressing in this unit in axial direction. Then the slotted distance ring 128 is introduced into the interior of the widened portion 114 and is fixed by re-shaping the lower end of the piston rod at 114a. The cup-shaped component 125 defines an annular space 127 within the piston rod 103, which is open to an internal chamber 125a of the cup-shaped component 125 by openings 126. This annular space 127 has the effect that the fluid exchange between the working chambers functions satisfactorily even if the openings 126 are not in alignment with the bores 113 of the piston rod 103.

Figure 4:
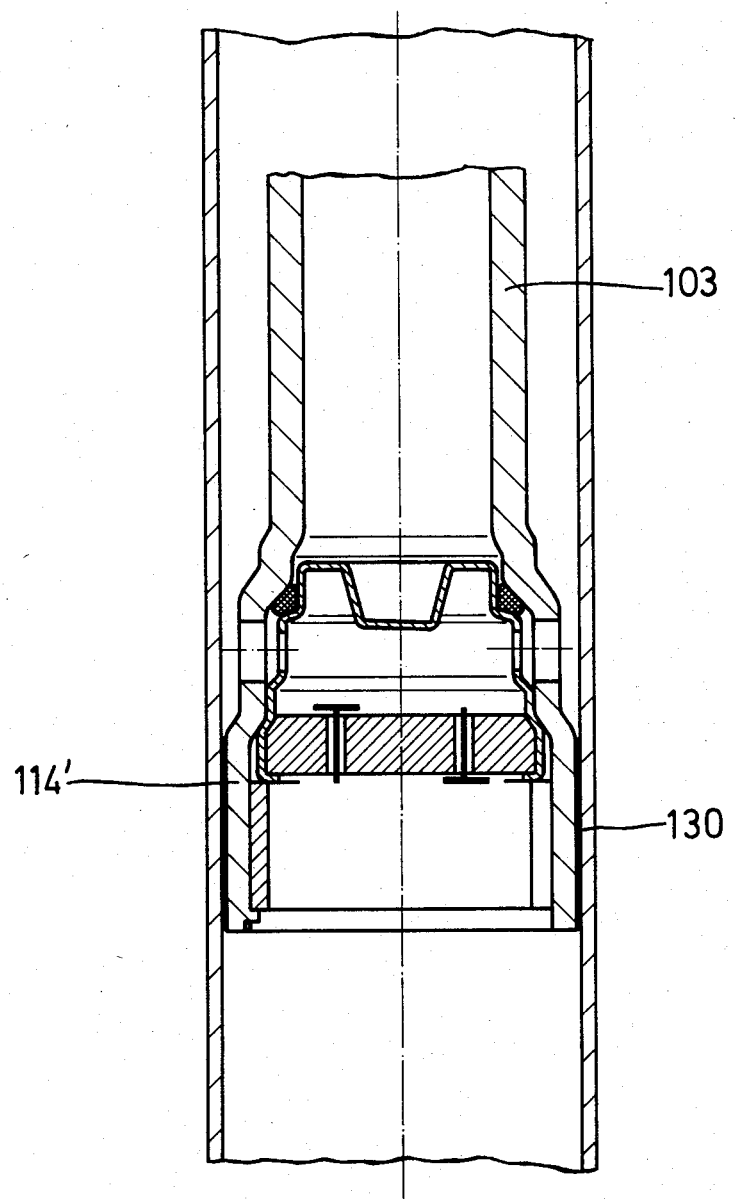
FIG. 4 shows a third embodiment of the piston rod-piston unit of this invention.

Favourable sliding properties between the widened portion 114 forming the piston and the inner wall of the cylinder 102 are achieved in the form of embodiment according to FIG. 3 by a guide and sealing ring 129 which is arranged in an appropriate recess in the widened portion 114. In this respect the form of embodiment according to FIG. 4 differs in that the widened portion 114' of the piston rod 103 is provided with a coating 130 consisting of a sliding material, for example, of polytetrafluoroethylene.

Figure 5:
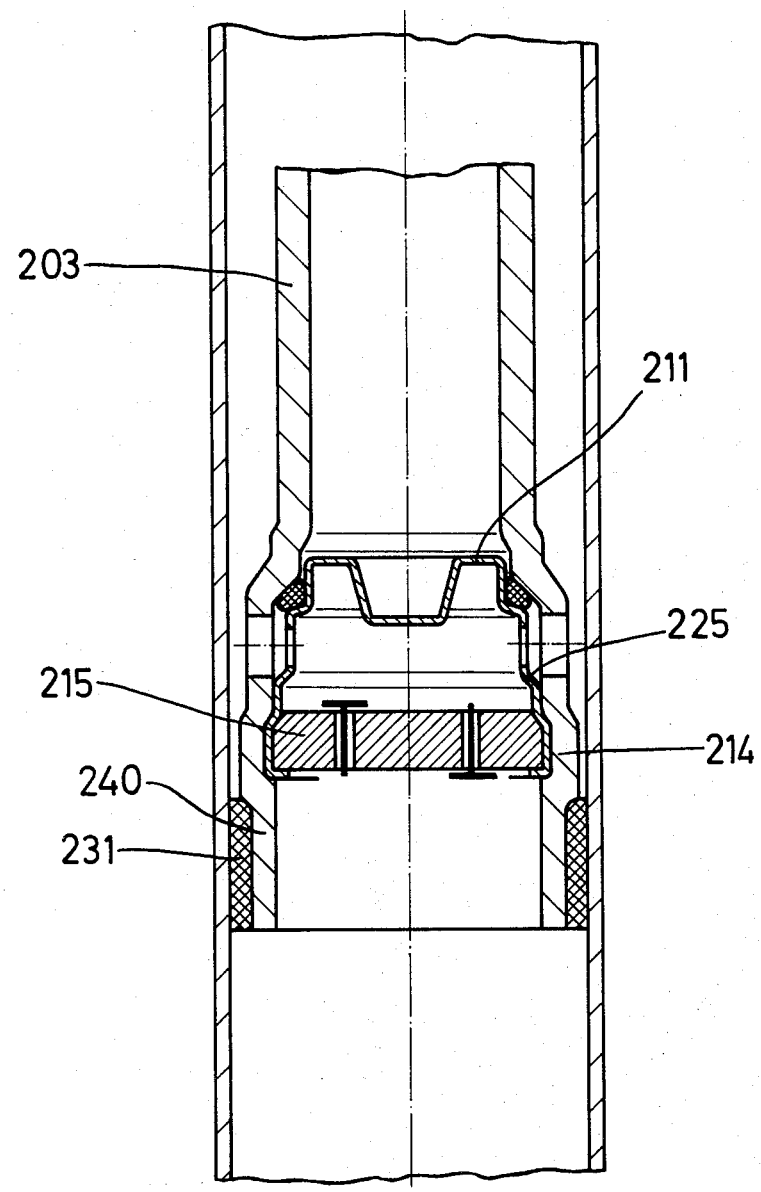
FIG. 5 shows a fourth embodiment of the piston rod-piston unit of this invention.

FIG. 5 shows further modifications of the embodiment of FIG. 3, analogous parts being designated by the same reference numbers, but furthermore increased by 100. The unit comprising the cup-shaped component 225 with the partition 211 and the damping device 215 is axially fixed by radial construction of the piston rod 203 at the lower end of the widened portion 214 beneath the damping device 215. The radial constriction 240 defines a reception for a guide and sealing ring 231 on the outer surface of the widened portion 214. This reception extends over a part of the axial length of the widened portion 214 and is downwardly open. In view of satisfactory fixing the guide and sealing ring 231, the latter is fixed in the reception by adhesive.

Figure 6:
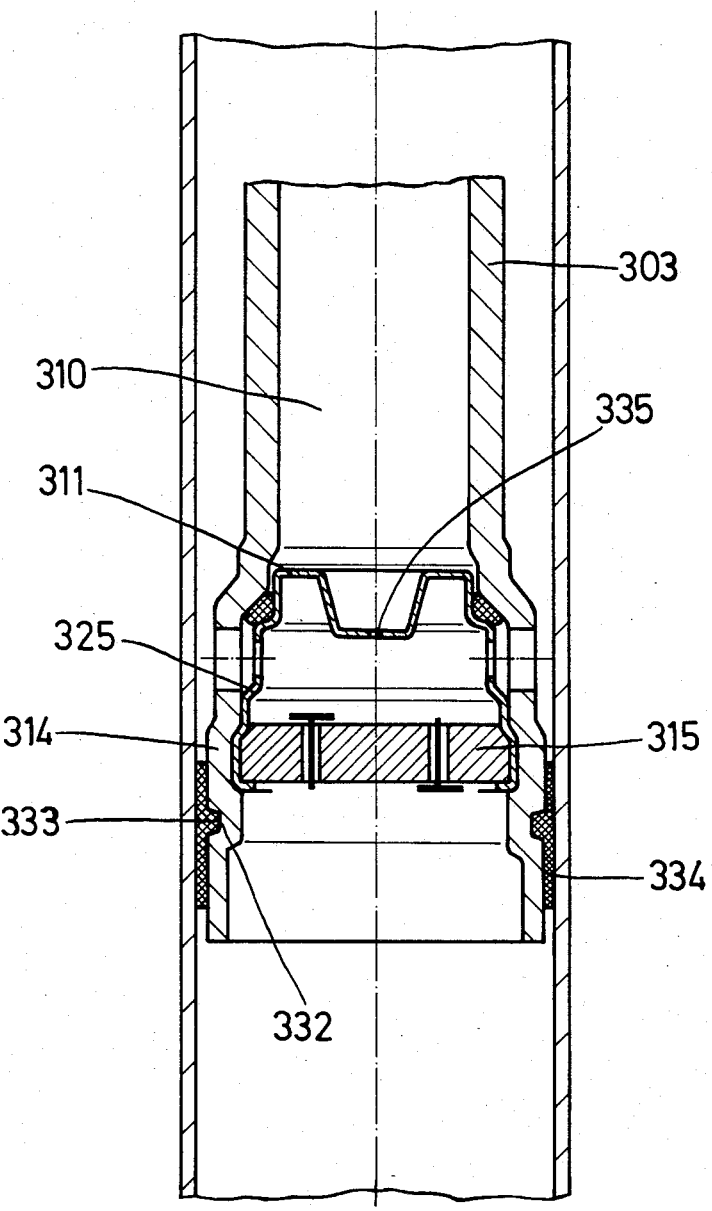
FIG. 6 shows a fifth embodiment of the piston rod-piston unit of this invention and FIG. 7 shows a sixth embodiment of the piston rod-piston unit of this invention.

A further modification of the embodiment of FIG. 3 is shown in FIG. 6, analogous parts being designated by the same reference numbers, but increased by 300. Here, the partition 311 is provided with a narrow passage 335. The interior 310 of the piston rod 303, filled with a liquid and pressurized gas, serves as compensation chamber for the vibration damper, since through this passage 335 there is merely effected a pressure compensation occurring in the case of temperature fluctuations. The unit, consisting of the damping device 315 and the cup-shaped component 325 including the partition 311, is fixed in the widened lower end 314 of the piston rod 303 by an annular depression 332 shaped by radial pressing. This annular depression 332 serves at the same time for axially securing a guide and sealing ring 334, which engages with corresponding radial projections 333 into the depression 332.

Figure 7:
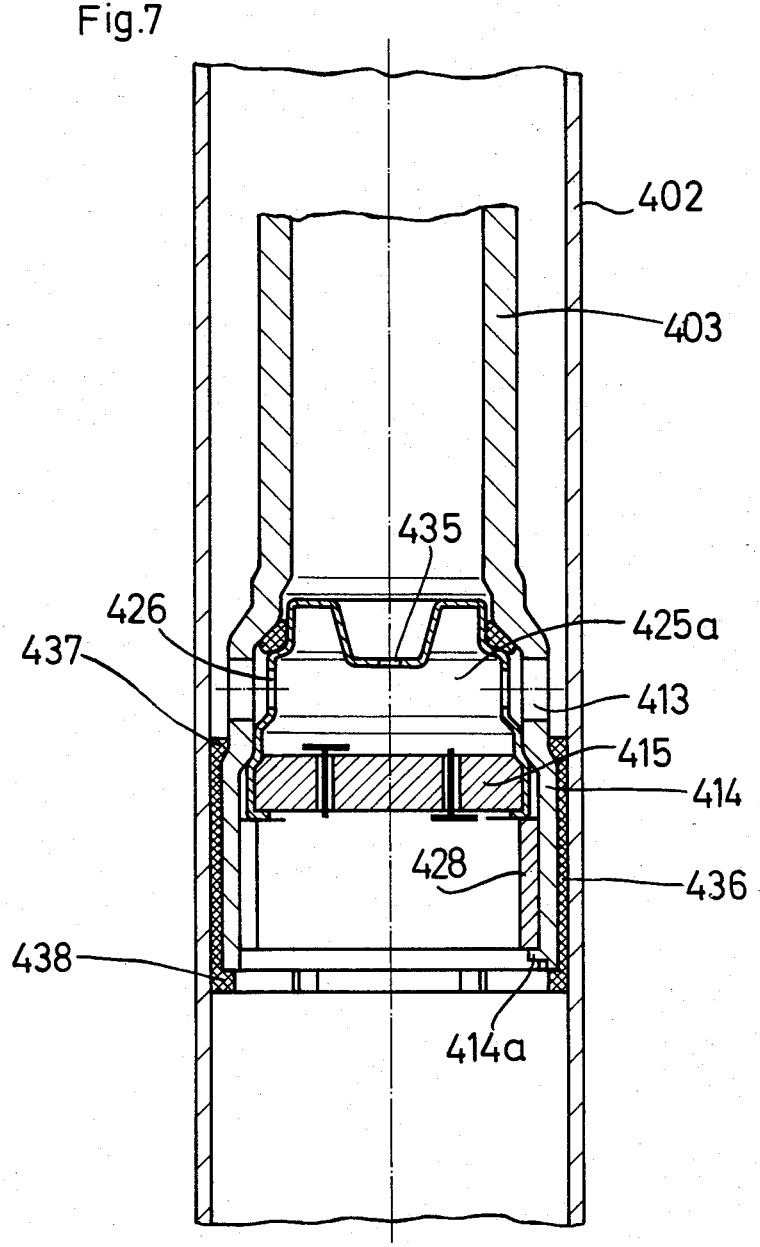

The embodiment according to FIG. 7 combines features of FIGS. 3 and 6, analogous parts being designated by the same reference numbers increased by 300 and 100, respectively. The widened portion 414 is covered by a guide and sealing sleeve 436. For axial fixing, this guide and sealing sleeve 436 has radially inwardly directed projections 437 at its upper end and radially inwardly directed projections 438 at its lower end.

Due to the accommodation of the damping valves and corresponding damping passages within the piston rod, a high functional reliability is guaranteed.

The testing expenses with the device of this invention are substantially reduced, since on the one hand no screw or welding connection of the piston with the piston rod is necessary and on the other hand, the securing of the damping device and the stationary partition is free of problems. Defects of production and assembly are thus largely excluded, so that most favourable production is achieved. The various embodiments of sealing and guiding means on the widened portion of the piston rod tube can be easily manufactured and assembled and are inexpensive. Good sealing and guiding results have been found.

By the partition in a connection with the associated annular sealing member, a perfect sealing off of the partial space defined by the piston rod tube at the partition is obtained at minimum expense. The combination of the damping unit and the partition as a pre-assembled unit provides the possibility of examining these most important components on a separate test apparatus as regards the required damping values before the installation in the piston rod.

The provision of the annular chamber between the piston rod and the cup-shaped member avoids the necessity of aligning the openings in the piston rod tube and in the cup-shaped member.

It is easily understandable that the damping plate can be easily sealed both with respect to the inner circumferential face of the piston rod tube and with respect to the cup-shaped member, respectively. Moreover, it can be easily understood that the cup-shaped member can be easily sealed off with respect to the inner circumferential face of the piston rod tube, for example, by the reshaping method.

In the embodiment of FIG. 6, the partial space 310 within the piston rod tube 303 can be utilized especially for a pressure compensation in the case of temperature fluctuation due to the presence of the opening 335. The partial space 310 may be partially filled with liquid adjacent the partition 335 and partially with a pressurized gas. A further movable separating wall between the liquid and the pressurized gas can be easily provided.

The provision of the shoulder as illustrated at 17 in FIG. 1 not only results in a simple abutment for limiting the outward movement of the piston rod tube, but also results in increased bending stiffness due to the increased diameter of the piston rod tube below the shoulder 17.

While specific embodiments of the invention have been shown and described in detail to illustrate the application of the inventive principles, it will be understood that the invention may be embodied otherwise without departing from such principles.

What is claimed is:

1. In a cylinder piston device comprising a cylinder member having an axis and two end walls comprising a first end wall and a second end wall, a cavity being defined within said cylinder member between said two end walls;
   a piston rod axially movable with respect to said cylinder member and extending through said first end wall;
   a piston unit provided on said piston rod within said cavity, said piston unit separating said cavity into two working chambers comprising a first working chamber adjacent said first end wall and a second working chamber adjacent said second end wall, said first working chamber being an annular working chamber radially extending between a radially outer surface of said piston rod and a radially inner surface of said cylinder member;
   fluid passage means extending between said first and said second working chambers across said piston unit;
   the improvement comprising
   said piston rod and said piston unit being integrally formed by a piston rod tube;
   said piston rod tube comprising a first section close to said second end wall of said cylinder member, having a maximum outside diameter along at least part of its axial length and carrying at least one guiding ring engaging said radially inner surface of said cylinder member;
   said piston rod tube further comprising a second section adjacent said first section towards the first end wall of said cylinder member, said second section having a diameter smaller than said maximum diameter, a first shoulder axially directed towards said second end wall being established by the transition from said first section to said second section;
   said piston rod tube further comprising a third section adjacent said second section towards said first end wall of said cylinder member, said third section having a diameter smaller than said second section, a second shoulder axially directed towards said second end wall being established by the transition from said second section to said third section;
   a partition being axially supported by said second shoulder through an annular sealing member;
   a damping member being axially supported by said first shoulder;
   said damping member comprising at least one damping passage therethrough;
   said second section of said piston rod tube comprising at least one substantially radially directed bore at a location axially between said damping member and said partition, said damping member being preassembled together with said partition into a damping plate-partition unit, said damping plate-partition unit being housed within said piston rod tube, a central passage chamber being defined between said partition and said damping member, said central passage chamber being in fluid connection with said second working chamber by said at least one damping passage and being in fluid connection with said first working chamber by said substantially radially directed bore of said second section.

2. A cylinder piston device as set forth in claim 1, wherein said partition is an integral part of a cup-shaped member, said partition defining the bottom of said cup-shaped member and said damping member extending across the opening in said cup-shaped member.

3. A cylinder piston device as set forth in claim 1, wherein an annular passage chamber is defined in radial direction between said cup-shaped member and said piston rod tube, said annular passage chamber being in fluid communication with said first working chamber by said substantially radially directed bore of said second section and with said central passage chamber by at least one opening of said cup-shaped member.

4. A cylinder piston device as set forth in claim 1, wherein said damping member is fastened to said piston rod tube by reshaping the first section thereof.

5. A cylinder piston device as set forth in claim 4, wherein said first section is reshaped such as to define a radial depression in the radial outer surface of said first section, said radial depression receiving at least a portion of said guiding ring.

6. A cylinder piston device as set forth in claim 1, wherein a guiding and seaing sleeve is provided on the radially outer surface of said first section, said guiding and sealing sleeve having a radially inwardly directed flange on at least one axial end thereof, said flange engaging at least one substantially axially directed abutment face of said piston rod tube.

7. A cylinder piston device as set forth in claim 1, wherein a guiding and sealing ring is fixed on the radially outer surface of said first section by adhesive means.

8. A cylinder piston device as set forth in claim 1, wherein a guiding and sealing coating is provided on the radially outer surface of said first section.

9. A cylinder piston device as set forth in claim 1, wherein said partition is provided with at least one opening.

10. A cylinder piston device as set forth in claim 1, wherein an abutment shoulder is provided on said piston rod, said abutment shoulder cooperating with said first end wall such as to limit outward movement of said piston rod with respect to said cylinder member.

11. A cylinder piston device as set forth in claim 1, wherein said piston rod extends through guiding and sealing means axially fixed with respect to said first end wall.

12. A cylinder piston device as set forth in claim 1, said partition being axially supported by said second shoulder through an annular sealing member.

* * * * *